(12) United States Patent
Papa et al.

(10) Patent No.: US 8,495,857 B2
(45) Date of Patent: Jul. 30, 2013

(54) GAS TURBINE ENGINE THERMAL MANAGEMENT SYSTEM

(75) Inventors: Federico Papa, Ellington, CT (US); Thomas G. Phillips, Coventry, CT (US); Kathleen R. Phillips, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/285,454

(22) Filed: Oct. 31, 2011

(65) Prior Publication Data
US 2013/0104559 A1    May 2, 2013

(51) Int. Cl.
*F02C 7/06* (2006.01)
*F02C 1/00* (2006.01)
*F02K 99/00* (2009.01)

(52) U.S. Cl.
USPC .............. 60/39.08; 60/266; 60/267; 60/772

(58) Field of Classification Search
USPC ............... 60/262, 266, 267, 39.08, 728, 736, 60/204, 226.1, 782, 785; 184/6.11
See application file for complete search history.

(56) References Cited

U.S. PATENT DOCUMENTS

| | | | |
|---|---|---|---|
| 7,765,788 B2 * | 8/2010 | Schwarz | 60/266 |
| 7,836,680 B2 | 11/2010 | Schwarz et al. | |
| 7,980,081 B2 * | 7/2011 | Mak | 60/779 |
| 7,984,606 B2 | 7/2011 | Smith | |
| 7,997,062 B2 * | 8/2011 | Sun et al. | 60/266 |
| 2009/0313999 A1 | 12/2009 | Hunter et al. | |
| 2010/0154427 A1 * | 6/2010 | Logan | 60/772 |
| 2010/0205977 A1 * | 8/2010 | Annigeri et al. | 60/783 |
| 2011/0023491 A1 | 2/2011 | Rendo et al. | |

* cited by examiner

*Primary Examiner* — Ehud Gartenberg
*Assistant Examiner* — Arun Goyal
(74) *Attorney, Agent, or Firm* — Carlson, Gaskey & Olds, P.C.

(57) ABSTRACT

A thermal management system for a gas turbine engine includes a first heat exchanger that provides a first conditioned fluid, a second heat exchanger in series flow communication with the first heat exchanger and that exchanges heat with the first conditioned fluid to provide a second conditioned fluid, and a third heat exchanger in parallel flow communication with the second heat exchanger and that selectively exchanges heat with the first conditioned fluid to provide a third conditioned fluid. The second conditioned fluid and the third conditioned fluid combine to provide a mixed conditioned fluid. A first portion of the mixed conditioned fluid including a first temperature is communicated to a first engine system. A second portion of the mixed conditioned fluid including a second temperature is communicated to a second engine system. The second temperature includes a greater temperature than the first temperature.

16 Claims, 2 Drawing Sheets

GAS TURBINE ENGINE THERMAL MANAGEMENT SYSTEM

BACKGROUND

This disclosure relates generally to a gas turbine engine, and more particularly to a gas turbine engine thermal management system that manages the heat generated by a gas turbine engine.

Gas turbine engines, such as turbofan gas turbine engines, generally include a fan section, a compressor section, a combustor section and a turbine section. During operation, airflow is pressurized in the compressor section and is mixed with fuel and burned in the combustor section. The hot combustion gases that are generated in the combustor section are communicated through the turbine section. The turbine section extracts energy from the hot combustion gases to power the compressor section, the fan section and other gas turbine engine loads.

A thermal management system can be employed within the gas turbine engine to manage the heat generated by the gas turbine engine. Thermal management systems maintain operable temperatures for the engine fuel, oil and other fluids that are communicated throughout the engine. For example, a portion of the heat of the engine oil can be transferred into the engine fuel to increase the efficiency of the gas turbine engine.

SUMMARY

A thermal management system for a gas turbine engine includes a first heat exchanger that provides a first conditioned fluid, a second heat exchanger in series flow communication with the first heat exchanger and that exchanges heat with the first conditioned fluid to provide a second conditioned fluid, and a third heat exchanger in parallel flow communication with the second heat exchanger and that selectively exchanges heat with the first conditioned fluid to provide a third conditioned fluid. The second conditioned fluid and the third conditioned fluid combine to provide a mixed conditioned fluid. A first portion of the mixed conditioned fluid including a first temperature is communicated to a first engine system. A second portion of the mixed conditioned fluid including a second temperature is communicated to a second engine system. The second temperature includes a greater temperature than the first temperature.

In another exemplary embodiment, a gas turbine engine includes a compressor section, a combustor section and a turbine section. The gas turbine engine includes a thermal management system incorporating a first fluid circuit and a second fluid circuit. The thermal management system manages heat generated in at least one of the compressor section, the combustor section and the turbine section. The first fluid circuit of the thermal management system selectively communicates a first portion of a conditioned fluid having a first temperature to a first engine system and a second portion of the conditioned fluid having a second temperature to a second engine system. The second temperature is a greater temperature than the first temperature.

In yet another exemplary embodiment, a method of managing heat generated during operation of a gas turbine engine with a thermal management system includes communicating a first portion of a conditioned fluid having a first temperature to a first engine system and communicating a second portion of the conditioned fluid having a second temperature to a second engine system. The second temperature is a greater temperature than the first temperature.

The various features and advantages of this disclosure will become apparent to those skilled in the art from the following detailed description. The drawings that accompany the detailed description can be briefly described as follows.

DETAILED DESCRIPTION

Figure 1:
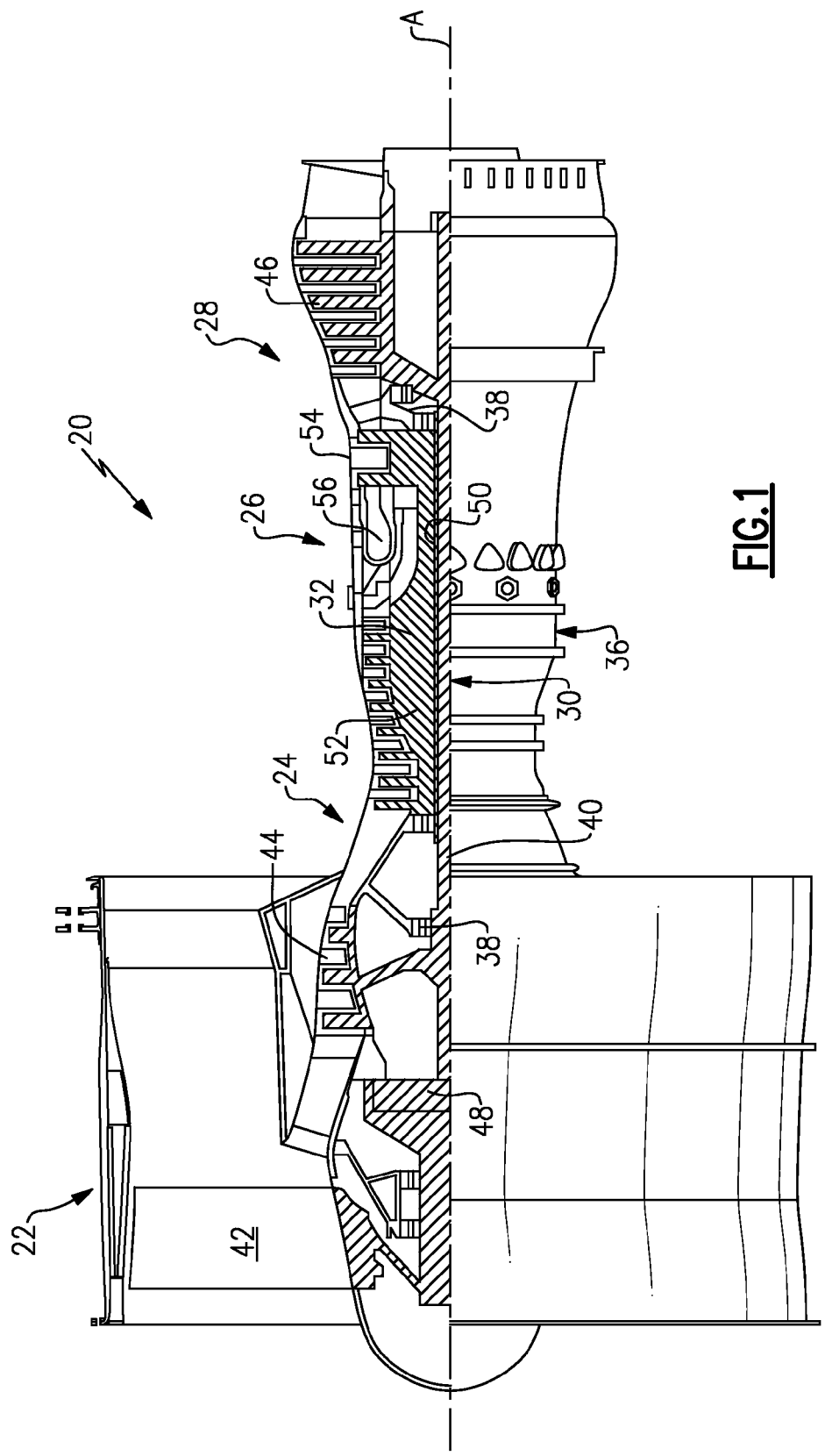
FIG. 1 schematically illustrates a gas turbine engine.

FIG. 1 schematically illustrates a gas turbine engine 20. The example gas turbine engine 20 is a two-spool turbofan engine that generally incorporates a fan section 22, a compressor section 24, a combustor section 26 and a turbine section 28. Alternative engines might include fewer or additional sections such as an augmenter section (not shown) among other systems or features. Generally, the fan section 22 drives air along a bypass flow path, while the compressor section 24 drives air along a core flow path for compression and communication into the combustor section 26. The hot combustion gases generated in the combustor section 26 are expanded by the turbine section 28. This view is highly schematic and is included to provide a basic understanding of the gas turbine engine 20 and not to limit the disclosure. This disclosure extends to all types of gas turbine engines and for all types of applications, including but not limited to turbofan, turbojet and turboprop engines.

The gas turbine engine 20 generally includes at least a low speed spool 30 and a high speed spool 32 mounted for rotation about an engine centerline axis A relative to an engine static structure 36 via several bearing systems 38. The low speed spool 30 generally includes an inner shaft 40 that interconnects a fan 42, a low pressure compressor 44 and a low pressure turbine 46. The inner shaft 40 can connect to the fan 42 through a geared architecture 48 to drive the fan 42 at a lower speed than the low speed spool 30. Although shown schematically, the geared architecture 48 can include a multitude of parts including but not limited to bearings, gears and drive mechanisms. The high speed spool 32 includes an outer shaft 50 that interconnects the high pressure compressor 52 and a high pressure turbine 54.

A combustor 56 is arranged between the high pressure compressor 52 and the high pressure turbine 54. The inner shaft 40 and the outer shaft 50 are concentric and rotate about the engine centerline axis A. A core airflow is compressed by the low pressure compressor 44 and the high pressure compressor 52, is mixed with fuel and burned within the combustor 56, and is then expanded over the high pressure turbine 54 and the low pressure turbine 46. The turbines 54, 46 rotationally drive the low speed spool 30 and the high speed spool 32 in response to the expansion.

Multiple sections of the gas turbine engine 20 generate heat during engine operation, including the fan section 22, the compressor section 24, the combustor section 26 and the turbine section 28. This heat may be carried by fluids that are communicated throughout these and other various sections of the gas turbine engine 20. For example, engine fuel and engine oil are circulated throughout the gas turbine engine 20 and carry a portion of the heat that is generated during engine operation. In this disclosure, the term "fluid" is intended to include fuel, oil, lubricating fluids, hydraulic fluids or any other fluids circulated through the gas turbine engine 20.

Figure 2:
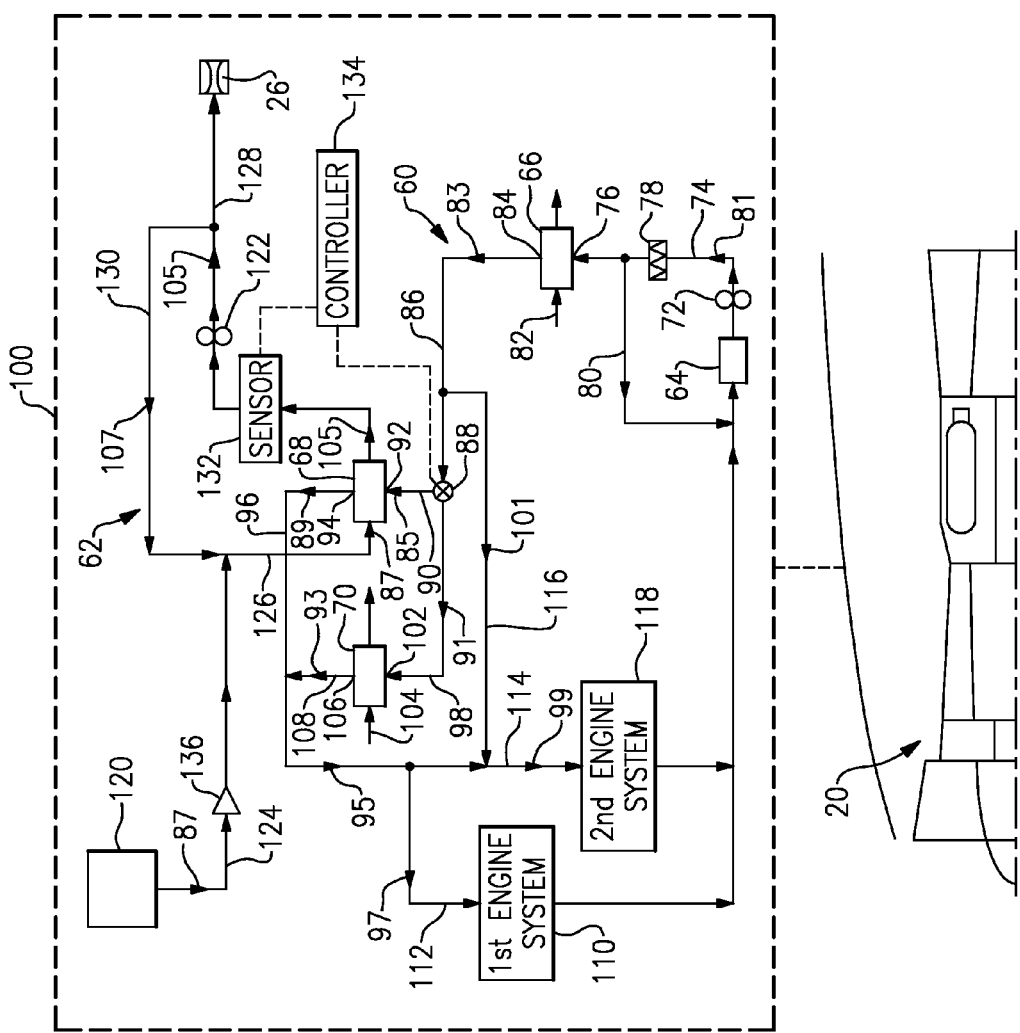
FIG. 2 illustrates an exemplary thermal management system for a gas turbine engine.

FIG. 2 illustrates a thermal management system 100 for a gas turbine engine, such as the gas turbine engine 20 illustrated by FIG. 1. The thermal management system 100 can manage the heat generated by the gas turbine engine 20 during its operation. The thermal management system 100 can communicate conditioned fluids to various engine systems of the gas turbine engine 20 to minimize this heat generation and dissipate the heat. For example, the thermal management system 100 can simultaneously deliver conditioned fluids having different temperatures to both low temperature systems and high temperature systems of the gas turbine engine 20, as is further discussed below. In this disclosure, the term "conditioned fluid" is intended to include heated, cooled and/or pressurized fluids. Of course, this view is highly schematic and is not necessarily shown to the scale it would be in practice.

The thermal management system 100 is mounted to the gas turbine engine 20. The mounting location of the thermal management system 100 is application specific. Non-limiting example mounting location for the thermal management system 100 include the engine static structure 36 (see FIG. 1), a core compartment, a fan compartment, a bypass fan passage and other locations.

The thermal management system 100 includes a first fluid circuit 60 and a second fluid circuit 62. For example, the first fluid circuit 60 can circulate a first fluid 81, such as engine oil, and the second fluid circuit 62 can circulate a second fluid 87, such as engine fuel. It should be understood that other fluids in addition to oil and fuel are contemplated as within the scope of this disclosure. In combination, the first fluid circuit 60 and the second fluid circuit 62 transfer heat between the fluids communicated through the separate circuits 60, 62 to manage the temperatures of these fluids, as is further discussed below.

The first fluid circuit 60 incorporates a fluid tank 64, a first heat exchanger 66, a second heat exchanger 68, a third heat exchanger 70 and a pump 72. The pump 72 pumps a first fluid (indicated by arrow 81), such as oil, from the fluid tank 64 along a passage 74 to an inlet 76 of the first heat exchanger 66. Optionally, the first fluid circuit 60 can include a filter 78 for filtering the first fluid 81 prior to communicating the first fluid 81 to the inlet 76. Additionally, the first fluid circuit 60 can include a trim passage 80 for returning a portion of the first fluid 81 to the fluid tank 64 in the event an excess amount of the first fluid 81 is pumped from the fluid tank 64.

The first fluid 81 is communicated through the first heat exchanger 66 and exchanges heat with a different fluid 82, such as air, to condition the first fluid 81. In this example, the first heat exchanger 66 is an air/oil cooler that exchanges heat between oil and air. However, other types of heat exchangers can also be utilized. Heat from the first fluid 81 is transferred into the fluid 82 to provide a first conditioned fluid 83 that exits an outlet 84 of the first heat exchanger 66.

The first conditioned fluid 83 is communicated along a passage 86 to a valve 88. The valve 88 controls the amount of the first conditioned fluid 83 that is communicated to the second heat exchanger 68 and the third heat exchanger 70. The second heat exchanger 68 either receives an entirety of the first conditioned fluid 83 that is received by the valve 88, or receives only a portion thereof, as is further detailed below. In other words, the first and second heat exchangers 66, 68 are in continuous operation during operation of the thermal management system 100, but the third heat exchanger 70 is only selectively operated as required.

A first portion 85 of the first conditioned fluid 83 is communicated to an inlet 92 of the second heat exchanger 68 along a passage 90. The first portion 85 of the first conditioned fluid 83 is communicated through the second heat exchanger 68 and exchanges heat with the second fluid 87, such as fuel, that is circulated through the second fluid circuit 62. The second heat exchanger 68 renders a second conditioned fluid 89 which is communicated through an outlet 94 of the second heat exchanger 68 and into a passage 96.

To the extent the third heat exchanger 70 receives a portion of the first conditioned fluid 83 (discussed in greater detail below), a second portion 91 of the first conditioned fluid 83 can be communicated along a passage 98 to an inlet 102 of the third heat exchanger 70. The second portion 91 of the first conditioned fluid 83 is communicated through the third heat exchanger 70 and exchanges heat with yet another fluid 104, such as air, to render a third conditioned fluid 93 that exits the third heat exchanger 70 at outlet 106. The third conditioned fluid 93 from the third heat exchanger 70 is communicated along a passage 108 and is eventually communicated into the passage 96 such that the second conditioned fluid 89 from the second heat exchanger 68 and the third conditioned fluid 93 from the third heat exchanger 70 are mixed together to render a mixed conditioned fluid 95.

A first portion 97 of the mixed conditioned fluid 95 is communicated to a first engine system 110 along a passage 112. A second portion 99 of the mixed conditioned fluid 95 is communicated along passage 114 and is mixed with a third portion 101 of the first conditioned fluid 83 (communicated from the first heat exchanger 66 along a bypass passage 116 that extends between the first heat exchanger 66 and a second engine system 118) and is communicated to a second engine system 118. In this way, conditioned fluids having varying temperatures can be delivered to separate engine systems. For example, a mixture of the second portion 99 of the mixed conditioned fluid 95 and the third portion 101 of the first conditioned fluid 83 can include a greater temperature than the first portion 97 of the mixed conditioned fluid 95.

The first engine system 110 could include a portion of the geared architecture 48 of the fan section 22, such as journal bearings or other parts of the geared architecture 48. The second engine system 118 could include an engine bearing compartment, an engine gearbox or a drive mechanism of the geared architecture 48. Although only two engine systems are illustrated, it should be understood that additional or fewer engine systems can receive conditioned fluids from the thermal management system 100.

The second fluid circuit 62 of the thermal management system 100 includes a fluid tank 120, the second heat exchanger 68 (which is also incorporated into the first fluid circuit 60) and a pump 122. The second fluid circuit 62 can also optionally include a secondary pump 136.

The fluid tank 120 stores a second fluid 87 that is different from the first fluid 81 for use by the gas turbine engine 20. In one example, the second fluid 87 is fuel. The pump 122 pumps the second fluid 87 from the fluid tank 120 along a passage 124 and through the second heat exchanger 68 along a passage 126 to extract heat from the first portion 85 of the first conditioned fluid 83 that is communicated through the second heat exchanger 68 in the first fluid circuit 60. A conditioned second fluid 105 is delivered along a passage 128 to a portion of the gas turbine engine, such as the combustor section 26 for generating the hot combustion gases that flow to the turbine section 28. A portion 107 of the conditioned second fluid 105 is returned to the passage 124 via a bypass passage 130.

The second fluid circuit 62 can also incorporate a sensor 132, such as a temperature sensor or other suitable sensor. The sensor 132 monitors the temperature of the conditioned second fluid 105. The sensor 132 communicates with an engine controller 134. The engine controller 134 is programmed with the necessary logic to interpret the information from the sensor 132, among other information, and modulate a positioning of the valve 88. The position of the valve 88 establishes what amount, if any, of the first conditioned fluid 83 will be communicated to the second and third heat exchangers 68, 70. In other words, the position of the valve 88 controls the amount of heat added to the second fluid 87 at different engine power conditions. Other valves, sensors and controls, although not shown, could also be incorporated into the thermal management system 100.

In one example, the third heat exchanger 70 receives a portion of the first conditioned fluid 83 only if a temperature of the conditioned second fluid 105 of the second fluid circuit 62 is above a predefined threshold. In one example, the predefined threshold is approximately 300° F./148.9° C., although the actual setting will depend on design specific parameters. If the sensor 132 alerts the engine controller 134 (via a signal, for example) that this predefined threshold has been exceeded, the controller 134 modulates the valve 88 to split a flow of the first conditioned fluid 83 between the second heat exchanger 68 and the third heat exchanger 70. Of course, other parameters can also be monitored and interpreted by the engine controller 134 in addition to the temperature from sensor 132, and other predefined thresholds can be set for controlling the valve 88. The actual amount of the first conditioned fluid 83 that is communicated to each of the second and third heat exchangers 68, 70 will vary depending upon the parameters monitored by the controller 134.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A thermal management system comprising:
a first fluid circuit including a first heat exchanger, a second heat exchanger, and a third heat exchanger, the first fluid circuit is configured so that:
a first conditioned fluid exits the first heat exchanger;
a first portion of the first conditioned fluid enters the second heat exchanger;
a second portion of the first conditioned fluid enters the third heat exchanger;
fluid exiting the second and third heat exchangers combine to form a first mixed fluid, a first portion of which enters a first engine system of a gas turbine engine; and
a second portion of the first mixed fluid and a third portion of the first conditioned fluid enter a second engine system of the gas turbine engine.

2. The system as recited in claim 1, wherein said first heat exchanger and said third heat exchanger are air/oil heat exchangers and said second heat exchanger is a fuel/oil heat exchanger.

3. The system as recited in claim 1, comprising a valve that selectively modulates to split said first conditioned fluid into said first portion and said second portion.

4. The system as recited in claim 3, comprising a sensor that communicates with a controller to selectively control a position of said valve.

5. The system as recited in claim 4, wherein said controller modulates said valve to communicate said second portion of said first conditioned fluid to said third heat exchanger in response to said sensor sensing that a predefined threshold has been exceeded.

6. The system as recited in claim 1, wherein said second heat exchanger is also incorporated into a second fluid circuit of the thermal management system.

7. An engine comprising the thermal management system as recited in claim 1, wherein said first engine system includes a portion of a geared architecture of said gas turbine engine.

8. An engine comprising the thermal management system as recited in claim 1, wherein said second engine system includes at least one of an engine bearing compartment, an engine gearbox and a drive mechanism of a geared architecture of the gas turbine engine.

9. The system as recited in claim 1, wherein said first conditioned fluid first mixed fluid are oil.

10. The system as recited in claim 1, comprising a fluid tank that communicates a fluid to an inlet of said first heat exchanger.

11. The system as recited in claim 10, comprising a filter between said fluid tank and said first heat exchanger.

12. The system as recited in claim 10, comprising a trim passage between said fluid tank and said first heat exchanger for returning a portion of said fluid to said fluid tank prior to entering said inlet of said first heat exchanger.

13. The system as recited in claim 1, wherein a conditioned second fluid from said second heat exchanger is communicated to a combustor of the gas turbine engine.

14. The system as recited in claim 13, wherein said conditioned second fluid is fuel and said fluid exiting said second heat exchanger is oil.

15. The system as recited in claim 1, wherein said first heat exchanger and said second heat exchanger are continuously operated and said third heat exchanger is only selectively operated.

16. An engine comprising the thermal management system as recited in claim 1, wherein said first engine system is a first portion of a geared architecture of a fan section of said gas turbine engine and said second engine system is a second, different portion of said geared architecture.

* * * * *